(12) United States Patent
Al-Qahtani

(10) Patent No.: US 8,740,277 B1
(45) Date of Patent: Jun. 3, 2014

(54) TRUCK BED WITH EXTENSIBLE RAILS

(71) Applicant: Saad Mohommed Al-Qahtani, Riqqa (KW)

(72) Inventor: Saad Mohommed Al-Qahtani, Riqqa (KW)

( * ) Notice: Subject to any disclaimer, the term of this patent is extended or adjusted under 35 U.S.C. 154(b) by 0 days.

(21) Appl. No.: 14/161,311

(22) Filed: Jan. 22, 2014

(51) Int. Cl.
*B60P 3/00* (2006.01)

(52) U.S. Cl.
USPC .......................................................... 296/3

(58) Field of Classification Search
USPC ....................................... 296/3, 26.04, 26.05
See application file for complete search history.

(56) References Cited

U.S. PATENT DOCUMENTS

| | | | |
|---|---|---|---|
| 3,460,864 A | 8/1969 | Piercy | |
| 6,332,637 B1 | 12/2001 | Chambers | |
| 6,634,689 B1 | 10/2003 | Soto | |
| 6,644,704 B1 | 11/2003 | Nyberg | |
| 6,698,810 B1 | 3/2004 | Lane | |
| 6,761,387 B2 | 7/2004 | Sloss | |
| 7,494,169 B2 | 2/2009 | Collins | |
| 7,581,917 B1 | 9/2009 | Depagter | |
| 8,608,219 B1 * | 12/2013 | Platto et al. | 296/3 |
| 2002/0125728 A1 | 9/2002 | Chambers | |
| 2003/0127875 A1 | 7/2003 | Hornick | |
| 2007/0278810 A1 * | 12/2007 | Collins | 296/3 |

FOREIGN PATENT DOCUMENTS

DE 31 38 338 A1 4/1983

* cited by examiner

*Primary Examiner* — Joseph Pape
(74) *Attorney, Agent, or Firm* — Richard C Litman

(57) ABSTRACT

The truck bed with extensible rails includes a front set of rails, a pair of side sets of rails, and a rear set of rails which selectively vertically translate from within the walls and tailgate defining a truck bed, such as those typically found in pickup trucks. The front set of rails and the pair of side sets of rails desirably vertically translate separately from the rear set of rails, and each set of rails can be selectively raised and lowered, under hydraulic power or the like, through actuation of a cabin-mounted control panel. The cabin-mounted control panel allows the vehicle operator to easily control the selective raising and lowering of the sets of rails through actuation of a hydraulic pump which is powered by the vehicle battery.

15 Claims, 4 Drawing Sheets

TRUCK BED WITH EXTENSIBLE RAILS

BACKGROUND OF THE INVENTION

1. Field of the Invention

The present invention relates generally to motor vehicle bodies, and particularly to a truck bed with extensible rails for selectively increasing the load-carrying volume of the truck bed of a conventional pickup truck or the like.

2. Description of the Related Art

Pickup trucks and similar vehicles are commonly used to haul a wide variety of materials and articles in their truck beds. However, the safe hauling capacity of the truck is limited by the height of the tailgate and sidewalls of the truck bed. For loads which exceed the height of the sidewalls and tailgate, users typically use ropes or flexible coverings in an attempt to secure the loads within the truck bed. Such attempts, though, are often unsuccessful, not only damaging the load when it falls from the truck bed, but also creating unsafe driving conditions for motorists in the vicinity.

Although various removable cabin structures, cages and the like are known for auxiliary usage with a truck bed, such structures can require a great deal of manual effort for both installation and removal thereof. It would be desirable to provide an automated system allowing for selective increase of the load-carrying volume of the truck bed.

Thus, a truck bed with extensible rails addressing the aforementioned problems is desired.

SUMMARY OF THE INVENTION

The truck bed with extensible rails includes a front set of rails, a pair of side sets of rails, and a rear set of rails which selectively vertically translate from within the walls and tailgate defining a truck bed, such as those typically found in pickup trucks. The truck bed is defined by a floor, having a front edge, a rear edge and a pair of opposed side edges, a front wall and a pair of sidewalls. The front wall extends upwardly from the front edge of the floor and includes an inner front panel and an outer front panel. The inner front panel and the outer front panel are spaced apart to define an interior region therebetween, with a front slot further being defined between upper edges of the inner and outer front panels. Similarly, the pair of sidewalls each extends upwardly from a respective one of the pair of opposed side edges of the floor, and each sidewall includes an inner side panel and an outer side panel. The inner side panel and the outer side panel are spaced apart to define an interior region therebetween, with a side slot further being defined between upper edges of the inner and outer side panels. Additionally, the tailgate is movably positioned adjacent to, and can be pivotally secured to, the rear edge of the floor and includes an inner tailgate panel and an outer tailgate panel. The inner tailgate panel and the outer tailgate panel are spaced apart to define an interior region therebetween, with a tailgate slot further being defined between upper edges of the inner and outer tailgate panels.

A front set of rails are slidably received within the interior region of the front wall, such that the front set of rails selectively vertically translate through the front slot; a pair of side sets of rails are respectively, slidably received within the interior regions of the pair of sidewalls, such that the side sets of rails respectively, selectively vertically translate through the side slots; and a rear set of rails are slidably received within the interior region of the tailgate, such that the rear set of rails selectively vertically translate through the tailgate slot. Desirably, the front set of rails and the pair of side sets of rails are fixedly secured to one another to form a single substantially U-shaped set of rails with an open rear. The single U-shaped set of rails and the rear set of rails are desirably separately driven to vertically translate under user control, driven by any suitable type of linear actuators, such as hydraulic actuators or the like.

These and other features of the present invention will become readily apparent upon further review of the following specification and drawings.

BRIEF DESCRIPTION OF THE DRAWINGS

Unless otherwise indicated, similar reference characters denote corresponding features consistently throughout the attached drawings.

DETAILED DESCRIPTION OF THE PREFERRED EMBODIMENTS

Figure 1:
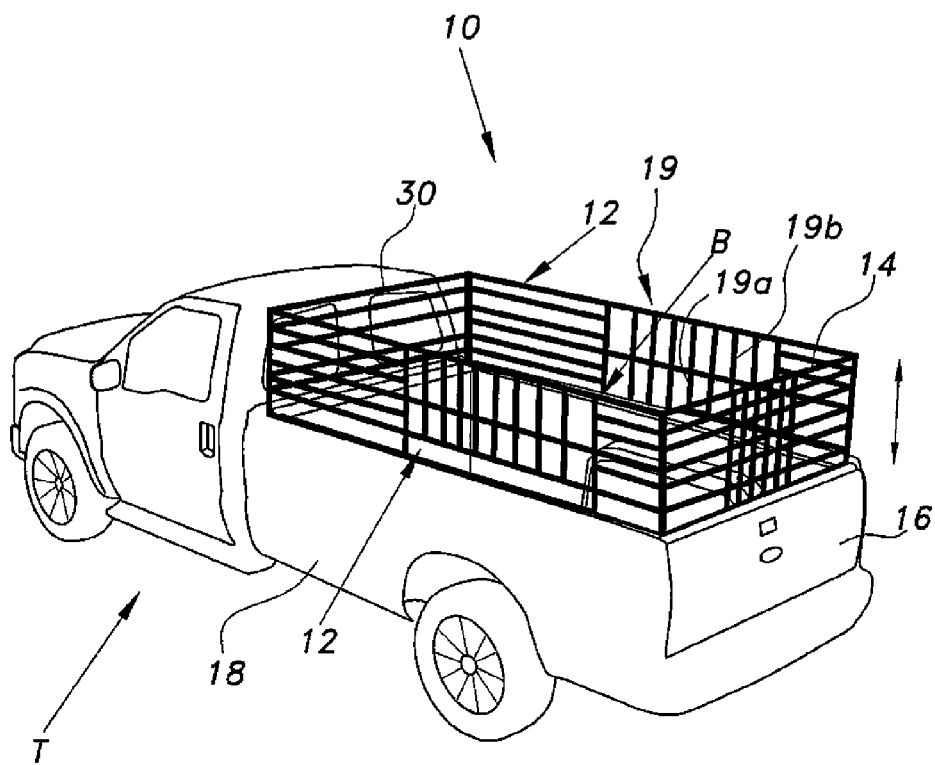
FIG. 1 is an environmental, perspective view of a truck bed with extensible rails according to the present invention.
Figure 2:
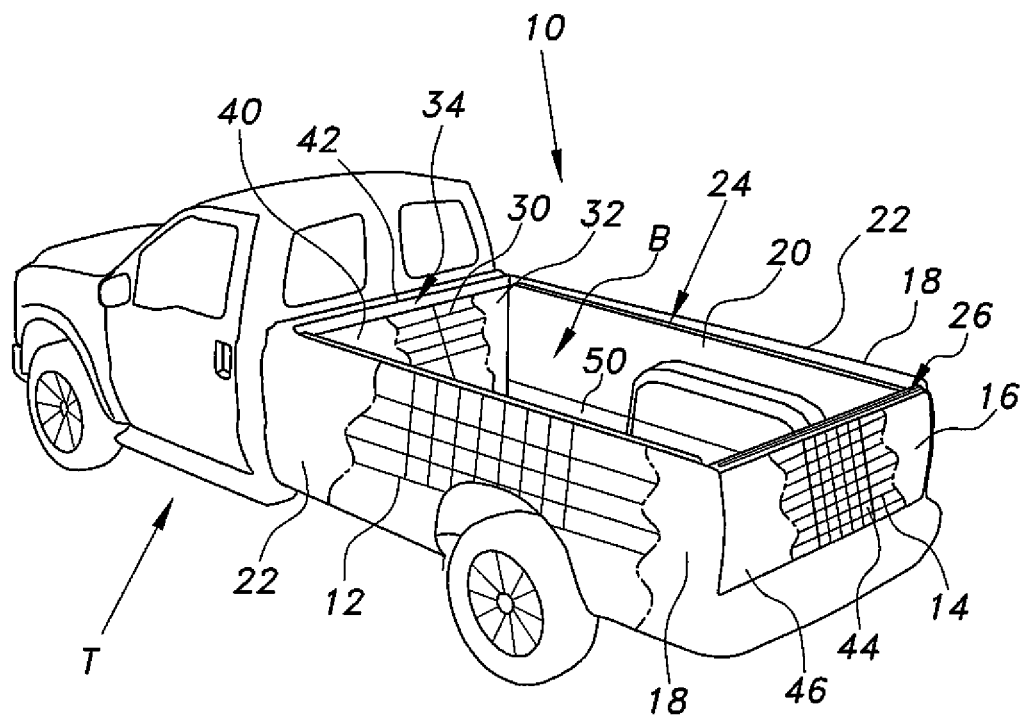
FIG. 2 is a partially cut-away, environmental, perspective view of the truck bed with extensible rails according to the present invention.

Referring now to FIGS. 1 and 2, the truck bed with extensible rails 10 includes a front set of rails 30, a pair of side sets of rails 12, and a rear set of rails 14 which selectively vertically translate, such as to be selectively raised or lowered to one or more positions, from within the walls and tailgate of a truck bed B, as typically found in pickup trucks. It should be understood that truck T and truck bed B of FIGS. 1-4 are shown for exemplary purposes only, and that the truck bed with extensible rails 10 can be used in combination with any suitable type of vehicle.

The truck bed B is defined by a floor 50, having a front edge, a rear edge and a pair of opposed side edges, a front wall 32 and a pair of sidewalls 18. The front wall 32 extends upwardly from the front edge of the floor 50 and includes an inner front panel 40 and an outer front panel 42 (best shown in FIG. 2). The inner front panel 40 and the outer front panel 42 are spaced apart to define an interior region therebetween, with a front slot 34 further being defined between upper edges of the inner and outer front panels 40, 42. Similarly, the pair of sidewalls 18 each extends upwardly from a respective one of the pair of opposed side edges of the floor 50, and each sidewall 18 includes an inner side panel 20 and an outer side panel 22. The inner side panel 20 and the outer side panel 22 are spaced apart to define an interior region therebetween, with a side slot 24 further being defined between upper edges of the inner and outer side panels 20, 22. Additionally, the tailgate 16 is movably positioned adjacent to, and can be pivotally secured to, the rear edge of the floor 50 and includes an inner tailgate panel 44 and an outer tailgate panel 46. The inner tailgate panel 44 and the outer tailgate panel 46 are spaced apart to define an interior region therebetween, with a tailgate slot 26 further being defined between upper edges of the inner and outer tailgate panels 44, 46.

A front set of rails 30 are slidably received within the interior region of the front wall 32, such that the front set of rails 30 selectively vertically translate through the front slot 34; a pair of side sets of rails 12 are respectively, slidably received within the corresponding interior regions of the pair of sidewalls 18, such that the side sets of rails 12 respectively, selectively vertically translate through the side slots 24; and a rear set of rails 14 are slidably received within the interior region of the tailgate 16, such that the rear set of rails 14 selectively vertically translate through the tailgate slot 26.

Figure 3:
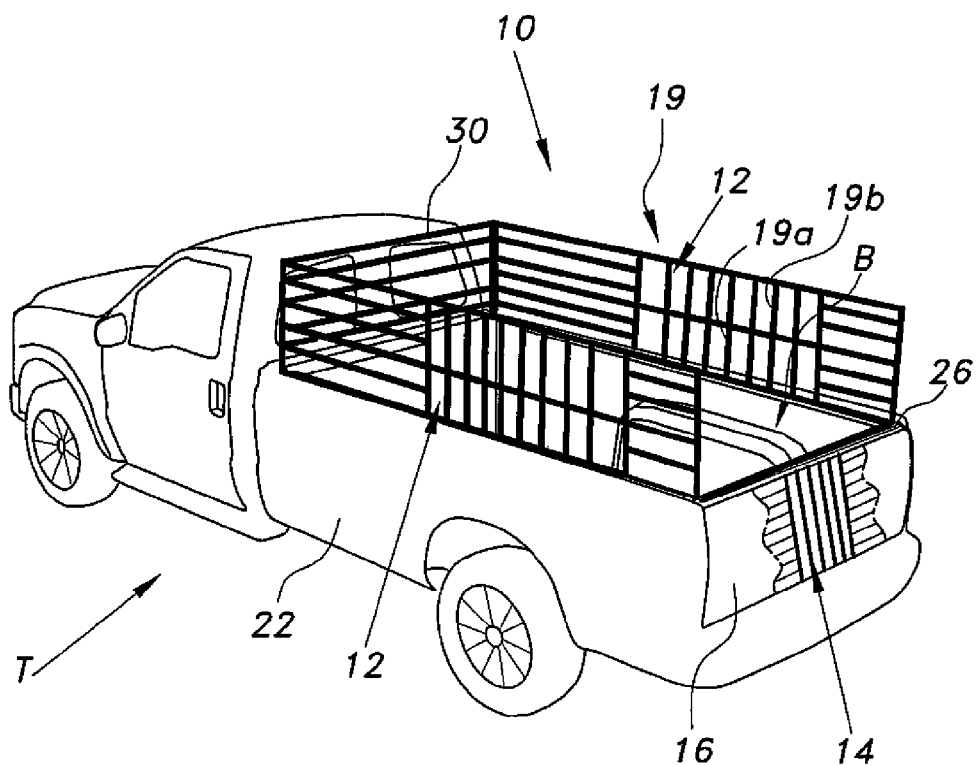
FIG. 3 is a partially cut-away, environmental, perspective view of the truck bed with extensible rails, showing separate operation of a set of rear rails and a pair of sets of side rails.

Desirably, the front set of rails 30 and the pair of side sets of rails 12 can be fixedly secured to one another to form a single substantially U-shaped set of rails with an open rear. The single U-shaped set of rails and the rear set of rails 14 are desirably separately driven to selectively vertically translate under user control. In FIGS. 1 and 2, the front set of rails 30, the side sets of rails 12 and the rear set of rails 14 are shown respectively extended and retracted together. However, as shown in FIG. 3, the rear set of rails 14 can be operated separately from the front and side sets of rails 30, 12, allowing the front and side sets of rails 30, 12 to be extended or lowered while the rear set of rails 14 can be independently retracted (as shown) or extended, to one or more positions. or vice versa, for example. Also, a cover, such as a one or more plastic tops or members, can be positioned to cover the one or more of the front slot 34, the side slots 24 and the tailgate slot 26 when one or more of the sets of rails 12, 14 and 30 are not extended and are located within their corresponding interior regions.

Figure 4:
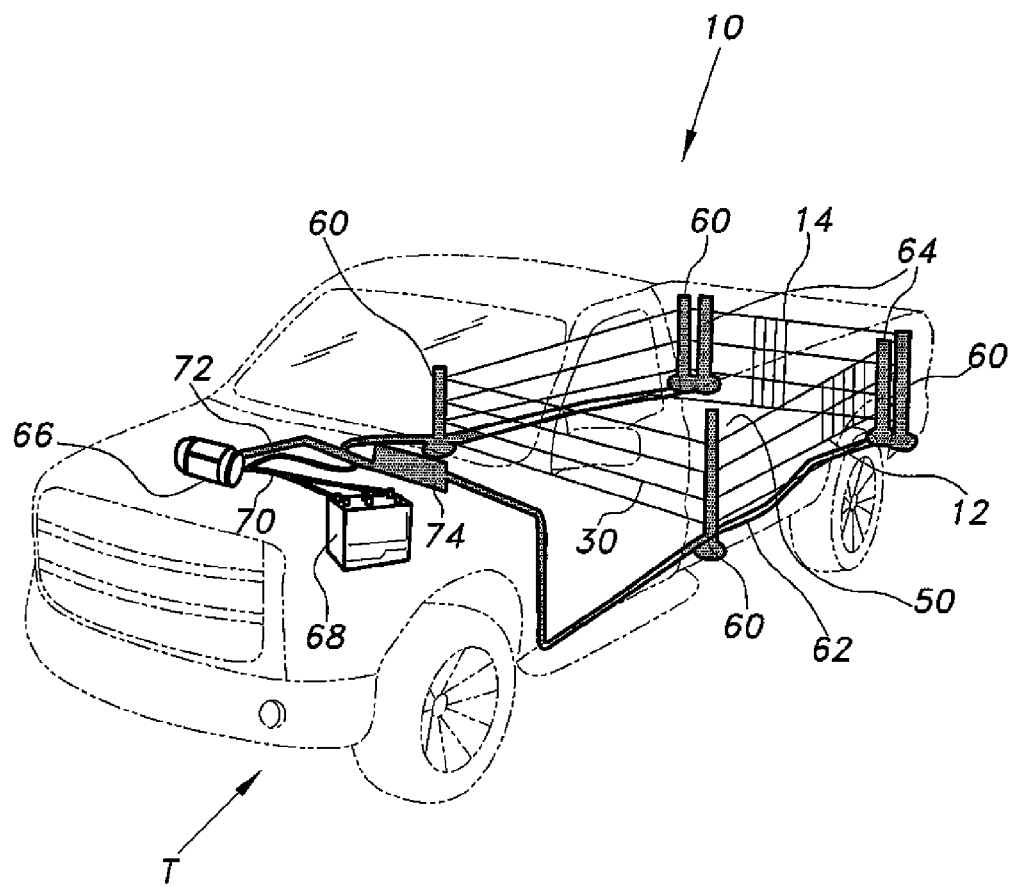
FIG. 4 diagrammatically illustrates a drive system of the truck bed with extensible rails.

The front and side sets of rails 30, 12 and the rear set of rails 14 can be driven to selectively raise and lower by any suitable type of linear actuator or the like, such as, for example, hydraulic actuators or cylinders 60, 64, as shown in FIG. 4. As shown, two pairs of first hydraulic actuators 60 can be mounted at the four corners defining truck bed B, such that each set of side rails 12 is mounted to, and extends between, a respective pair of first hydraulic actuators 60. Further, the front set of rails 30 is desirably mounted to, and extends between, a front pair of the first hydraulic actuators 60. Thus, under user control (desirably by a cabin-mounted controller 74), the user can selectively raise and lower the front set of rails 30 and the pair of side sets of rails 12 together. In order to allow the rear set of rails 14 to be selectively raised and lowered separately from the front set of rails 30 and the pair of side sets of rails 12, a pair of second hydraulic actuators 64 are desirably mounted on opposite ends of the tailgate 16, as shown. The rear set of rails 14 are mounted to, and extend between, the pair of second hydraulic actuators 64.

Also, all, a part of or a portion of the sets of rails 12, 14 and 30 can include generally "comb-shaped" rails 19 having a plurality of portions, such as a lower portion 19a and at least one upper portion 19b, as shown in FIGS. 1 and 3, for example. The comb-shaped rails 19 at least one upper portion 19b can be selectively raised from or lowered into the lower portion 19a, such as in a telescoping type arrangement, to position a corresponding upper portion 19b of the comb-shaped rail 19 at one or more positions relative to the corresponding lower portion 19a, such as by a suitable electric or hydraulic actuator, such as under control of the controller 74, for example.

Also, under user control, such as via the cabin-mounted controller 74, a hydraulic pump 66 selectively pumps hydraulic fluid, via lines 62, to the first hydraulic actuators 60 and/or second hydraulic actuators 64, to selectively vertically translate the corresponding one or more of the front set of rails 30, the pair of side sets of rails 12, or the rear set of rails 14, to selectively raise or lower the sets of rails 12, 14 and 30 to one or more positions. The cabin-mounted controller 74 in conjunction with the hydraulic pump 66 that selectively pumps hydraulic fluid, via lines 62, and the first hydraulic actuators 60 and/or second hydraulic actuators 64 include examples of various means for selectively driving vertical translation of the front set of rails 30, the pair of side sets of rails 12, or the rear set of rails 14. The hydraulic pump 66 can be powered by a vehicle battery 68, shown in FIG. 4 in communication with hydraulic pump 66 by cable or wire 70.

Controller 74, as can also be powered by the battery 68, can be any suitable type of controller, such as a suitable type of computer implemented device, such as a microprocessor, programmable controller, programmable logic controller (PLC), microcontroller, system on chip (SOC) processor, application specific integrated circuit (ASIC), a set of switches, or a combination thereof, or the like. The controller 74 communicates with the hydraulic pump 66 through cable or wire 72 to selectively actuate pump 66 which, in turn, selectively actuates first hydraulic actuators 60 and/or second hydraulic actuators 64.

It is to be understood that the present invention is not limited to the embodiments described above, but encompasses any and all embodiments within the scope of the following claims.

I claim:

1. A truck bed with extensible rails, comprising:
a floor having a front edge, a rear edge and a pair of opposed side edges;
a front wall extending upwardly from the front edge of said floor, said front wall comprising an inner front panel and an outer front panel, said inner front panel and said outer front panel being spaced apart to define an interior region therebetween, a front slot further being defined between upper edges of said inner and outer front panels;
a pair of sidewalls each extending upwardly from a respective one of the pair of opposed side edges of said floor, wherein each said sidewall comprises an inner side panel and an outer side panel, said inner side panel and said outer side panel being spaced apart to define an interior region therebetween, a side slot further being defined between upper edges of said inner and outer side panels;
a tailgate movably positioned adjacent to the rear edge of said floor, said tailgate comprising an inner tailgate panel and an outer tailgate panel, said inner tailgate panel and said outer tailgate panel being spaced apart to define an interior region therebetween, a tailgate slot further being defined between upper edges of said inner and outer tailgate panels;
a front set of rails slidably received within the interior region of said front wall, wherein said front set of rails selectively vertically translate through the front slot;
a pair of side sets of rails respectively, slidably received within the interior regions of said pair of sidewalls, wherein said side sets of rails respectively, selectively vertically translate through the side slots;
means for selectively driving vertical translation of said front set of rails and said pair of side sets of rails together;
a rear set of rails slidably received within the interior region of said tailgate, wherein said rear set of rails selectively vertically translate through the tailgate slot;
wherein at least one of the front, pair of side, and rear rails includes a lower portion and a corresponding upper portion, wherein the corresponding upper portion can be selectively positioned relative to the lower portion; and
means for selectively driving vertical translation of said rear set of rails.

2. The truck bed with extensible rails as recited in claim 1, wherein said front set of rails and said pair of side sets of rails are fixedly secured together, whereby said front of rails and said pair of side sets of rails selectively vertically translate together.

3. The truck bed with extensible rails as recited in claim 2, wherein said means for selectively driving vertical translation of said front set of rails and said pair of side sets of rails comprise at least one first hydraulic actuator.

4. The truck bed with extensible rails as recited in claim 3, wherein said means for selectively driving vertical translation of said rear set of rails comprises at least one second hydraulic actuator.

5. The truck bed with extensible rails as recited in claim 4, further comprising:
a hydraulic pump for selectively actuating said first and second hydraulic actuators.

6. A truck bed with extensible rails, comprising:
a floor having a front edge, a rear edge and a pair of opposed side edges;
a front wall extending upwardly from the front edge of said floor, said front wall comprising an inner front panel and an outer front panel, said inner front panel and said outer front panel being spaced apart to define an interior region therebetween, a front slot further being defined between upper edges of said inner and outer front panels;
a pair of sidewalls each extending upwardly from a respective one of the pair of opposed side edges of said floor, wherein each said sidewall comprises an inner side panel and an outer side panel, said inner side panel and said outer side panel being spaced apart to define an interior region therebetween, a side slot further being defined between upper edges of said inner and outer side panels;
a tailgate pivotally secured to the rear edge of said floor, said tailgate comprising an inner tailgate panel and an outer tailgate panel, said inner tailgate panel and said outer tailgate panel being spaced apart to define an interior region therebetween, a tailgate slot further being defined between upper edges of said inner and outer tailgate panels;
a front set of rails slidably received within the interior region of said front wall, wherein said front set of rails selectively vertically translate through the front slot;
a pair of side sets of rails respectively, slidably received within the interior regions of said pair of sidewalls, wherein said side sets of rails respectively, selectively vertically translate through the side slots, wherein said front set of rails and said pair of side sets of rails are fixedly secured together, whereby said front of rails and said pair of side sets of rails selectively vertically translate together;
means for selectively driving vertical translation of said front set of rails and said pair of side sets of rails simultaneously;
a rear set of rails slidably received within the interior region of said tailgate, wherein said rear set of rails selectively vertically translate through the tailgate slot; and
means for selectively driving vertical translation of said rear set of rails.

7. The truck bed with extensible rails as recited in claim 6, wherein said means for selectively driving vertical translation of said front set of rails and said pair of side sets of rails comprise at least one first hydraulic actuator.

8. The truck bed with extensible rails as recited in claim 7, wherein said means for selectively driving vertical translation of said rear set of rails comprises at least one second hydraulic actuator.

9. The truck bed with extensible rails as recited in claim 8, further comprising:
a hydraulic pump for selectively actuating said first and second hydraulic actuators.

10. A truck bed with extensible rails, comprising:
a floor having a front edge, a rear edge and a pair of opposed side edges;
a front wall extending upwardly from the front edge of said floor, said front wall comprising an inner front panel and an outer front panel, said inner front panel and said outer front panel being spaced apart to define an interior region therebetween, a front slot further being defined between upper edges of said inner and outer front panels;
a pair of sidewalls each extending upwardly from a respective one of the pair of opposed side edges of said floor, wherein each said sidewall comprises an inner side panel and an outer side panel, said inner side panel and said outer side panel being spaced apart to define an interior region therebetween, a side slot further being defined between upper edges of said inner and outer side panels;
a tailgate movably positioned adjacent to the rear edge of said floor, said tailgate comprising an inner tailgate panel and an outer tailgate panel, said inner tailgate panel and said outer tailgate panel being spaced apart to define an interior region therebetween, a tailgate slot further being defined between upper edges of said inner and outer tailgate panels;
a front set of rails slidably received within the interior region of said front wall, wherein said front set of rails selectively vertically translate through the front slot;
a pair of side sets of rails respectively, slidably received within the interior regions of said pair of sidewalls, wherein said side sets of rails respectively, selectively vertically translate through the side slots;
means for selectively driving vertical translation of said front set of rails and said pair of side sets of rails;
wherein said front pair of rails and said pair of side sets of rails are fixedly secured together, whereby said front set of rails and said pair of side sets of rails selectively vertically translate together;
a rear set of rails slidably received within the interior region of said tailgate, wherein said rear set of rails selectively vertically translate through the tailgate slot; and
means for selectively driving vertical translation of said rear set of rails separately from said front set of rails and said pair of side sets of rails.

11. The truck bed with extensible rails as recited in claim 10, wherein said means for selectively driving vertical translation of said front set of rails and said pair of side sets of rails comprise at least one first hydraulic actuator.

12. The truck bed with extensible rails as recited in claim 11, wherein said means for selectively driving vertical translation of said rear set of rails comprises at least one second hydraulic actuator.

13. The truck bed with extensible rails as recited in claim 12, further comprising:
a hydraulic pump for selectively actuating said first and second hydraulic actuators.

14. The truck bed with extensible rails as recited in claim 10, wherein said tailgate is pivotally secured to the rear edge of said floor.

15. The truck bed with extensible rails as recited in claim 10, wherein one or more of said front set of rails, said pair of side sets of rails, or said rear set of rails comprise at least one generally comb-shaped rail, each comb-shaped rail having a plurality of portions, including a lower portion and at least one upper portion, wherein the at least one upper portion can be selectively raised from or lowered into a corresponding lower portion to position a corresponding upper portion of the comb-shaped rail at one or more positions relative to the corresponding lower portion.

* * * * *